Sept. 7, 1965     W. B. CROSS     3,205,106
METHOD OF INCREASING STIFFNESS OF AN INFLATED STRUCTURE
Filed July 16, 1964     4 Sheets-Sheet 1

*INVENTOR.*
WILLIAM B. CROSS
BY
ATTORNEY

Sept. 7, 1965 W. B. CROSS 3,205,106
METHOD OF INCREASING STIFFNESS OF AN INFLATED STRUCTURE
Filed July 16, 1964 4 Sheets-Sheet 2

INVENTOR.
WILLIAM B. CROSS
BY
ATTORNEY

Sept. 7, 1965 W. B. CROSS 3,205,106
METHOD OF INCREASING STIFFNESS OF AN INFLATED STRUCTURE
Filed July 16, 1964 4 Sheets-Sheet 3

INVENTOR.
WILLIAM B. CROSS
BY
ATTORNEY

United States Patent Office 3,205,106
Patented Sept. 7, 1965

3,205,106
METHOD OF INCREASING STIFFNESS OF AN INFLATED STRUCTURE
William B. Cross, Akron, Ohio, assignor to Goodyear Aerospace Corporation, Akron, Ohio, a corporation of Delaware
Filed July 16, 1964, Ser. No. 384,044
7 Claims. (Cl. 156—79)

The present invention relates to a method of reinforcing inflatable structures and, more particularly, to a method of increasing the strength and rigidity of inflatable panels having outer skins connected with a plurality of drop cords. This application is a continuation-in-part of my previous patent application Serial No. 187,000, filed April 12, 1962, for Inflated Structure and Method of Increasing Stiffness Thereof, now abandoned.

It is the general object of the invention to provide a relatively simple and inexpensive method of increasing the rigidity of an inflatable structure.

Another object of the invention is the provision of a method which utilizes the structure of an inflatable panel to increase its rigidity without substantially increasing its weight.

Another object of the invention is to provide an inflatable structure having contoured surfaces to increase its bending and compressive strength.

Another object of the invention is the provision of a method of increasing the rigidity of an inflatable panel by providing the skins thereof with elongated cylindrical convex contours.

According to the invention, an inflatable structure having substantially parallel outer skins connect with a plurality of flexible drop cords extending in straight parallel lines between the skins, such as the trademark product "Airmat" sold by the Goodyear Tire & Rubber Company, is provided with elongated contoured surfaces to increase its bending and compressive strength. The method of increasing the strength and rigidity of an inflatable structure such as a panel having flexible and elastic outer skins interconnected with a plurality of drop threads includes the steps of severing the drop threads which interconnect the skins in an elongated path or eliminating the drop threads along the elongated path. More drop threads may be added at the edges of the elongated path for strengthening. The subsequent inflation of the panel with sufficient fluid pressure to deform the skins into elongated cylindrical convex contours in the area adjacent the severed drop threads increases the strength and rigidity of the panels without substantially increasing its weight. The contoured or corrugated surface of the inflated panel provides the panel with increased structural strength. The strength of the panel is further increased by filling the space between the skins with a foamed material which has been expanded to provide the skins with cylindrical convex contours in the areas adjacent the severed drop threads. The voids in the foamed material function as minute shock absorbers by restricting the flow of fluid within the inflated panel.

The exact nature of this invention as well as other objects and advantages thereof will be readily apparent from a consideration of the following specification relating to the annexed drawing in which.

Figure 1:
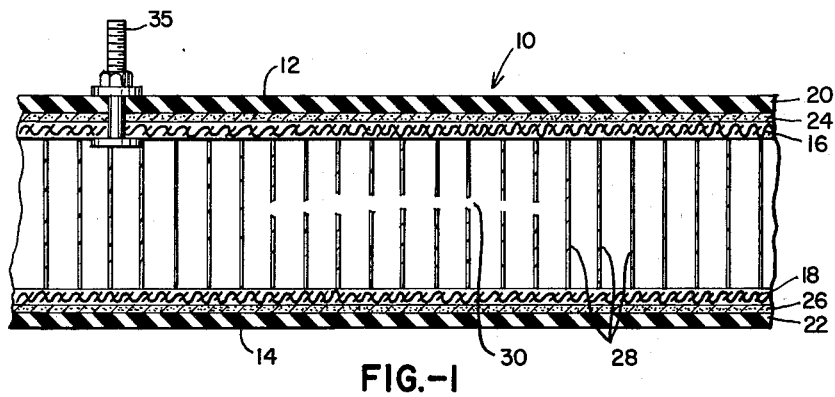
FIG. 1 shows a section of a portion of a deflated panel having severed drop threads.
Figure 2:
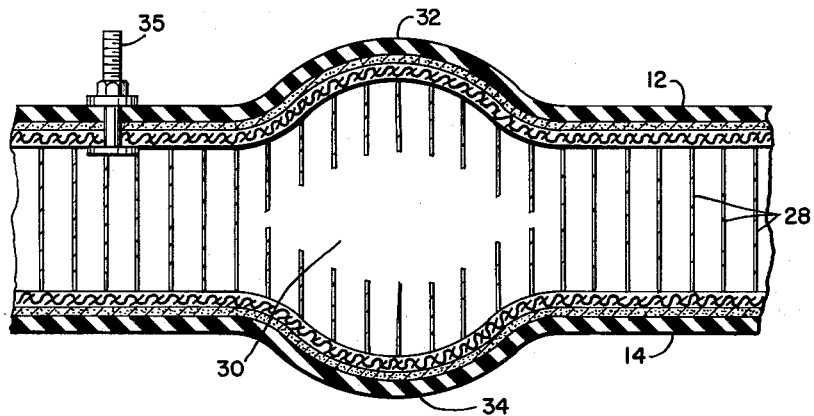
FIG. 2 shows a section of a portion of an inflated panel having severed drop threads.
Figure 3:
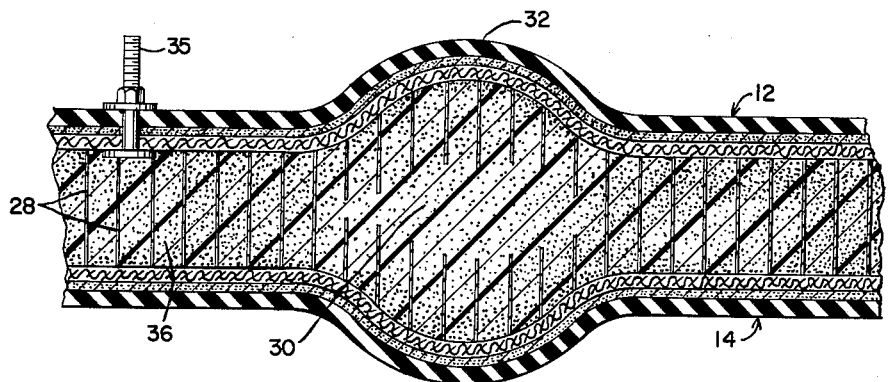
FIG. 3 shows a section of a panel having several drop threads and inflated with a foamed material.

Referring to the drawing, there is shown in FIGS. 1, 2, and 3 a cross section of an inflatable structural container or panel 10 having spaced outer skins 12 and 14. Each skin is a laminate containing a fabric layer 16, 18, and a layer 20, 22, of flexible and elastic fluid-impermeable material, such as rubber. The layers are bonded together with an adhesive 24, 26. In some cases the impermeable material may be self-adhering and will not require an adhesive layer.

The respective skins are spaced apart in a side by side relationship and are interconnected with a plurality of flexible strands or drop threads 28 woven into the fabric layers 16 and 18. The individual drop threads are secured to the skins and function as a group to hold the skins in parallel relationship. Generally, the number of drop threads 28 utilized will be measured by density per square inch and the invention contemplates that the density will vary from between about 5 drop yarns per square inch to about 75 drop yarns per square inch.

The strength and rigidity of the panel is increased by severing the drop threads in area 30 with a cutting tool of a size and shape necessary to achieve a desired cutting path. It should be understood with respect to this modification, as well as those described hereinafter, that the severing of the drop threads in the desired area is generally accomplished before the respective skins are brought together on all sides to make a closed inflatable structure so the drop threads are accessible. As shown in FIG. 2, the skins 12 and 14 of the panel are expanded into cylindrical convex contours 32 and 34 by the application of fluid pressure through the valve 35 into the panel. The contoured or corrugated surface of the panel increases the bending and compression strength of the panel. Of course, it should also be understood that there will be slight contours in the outer surfaces of the panel between all adjacent drop yarns, even though the drop yarns do hold the surfaces in substantially parallel or predetermined spaced relationship. But it is only when the distance between the adjacent drop yarns is increased, generally between about 3 and about 20 times, by cutting or eliminating that the raised contours 32 and 34 of FIG. 2 are formed upon inflation to increase the strength of the panel.

As shown in FIG. 3 the panel having its drop threads severed in area 30 is expanded with a foamed material 36 such as polyurethane or polystyrene. The panel may also be expanded with fluid pressure combined with the action of the foamed material. The foamed material prior to its expansion may be placed within the panel in a frozen state to keep it inactive. After the material is placed within the panel it is allowed to warm up. The increase in temperature of the material activates the foaming action and curing of the material within the panel.

The foamable material may be injected in the panel in a liquid state and allowed to flow therethrough. In a short period of time the material will self-cure and fill the space between the skins and provide cylindrical convex contours therein.

A mixture of foamable materials that react to relatively low applications of heat may be placed within the panel in sufficient amounts to coat the inside surfaces of the skins and the drop cords. These coated surfaces are permitted to dry thereby allowing the panel to be stored or shipped in a deflated condition. The subsequent application of the heat will activate the foaming characteristics of the coating material to provide a foamed core between the panel which will fill the space between the skins and provide cylindrical convex contours thereon adjacent the severed drop threads.

Figure 4:
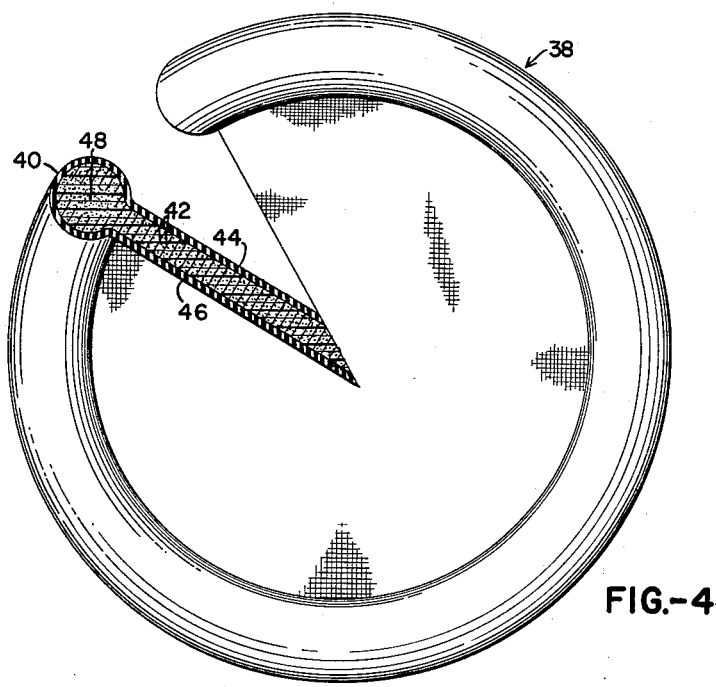
FIG. 4 shows a disc-shaped panel having a sector removed to illustrate the peripheral bead formed by severing the drop threads and filled with a foamed material.

FIG. 4 shows a circular fluid inflatable panel 38 having an outer peripheral bead 40. The panel is formed with drop threads 42 interconnecting flexible skins 44 and 46. The drop threads are severed in a circular path defined by the periphery of the panel by a convenient tool, such as a contractible wire. The panel is inflated with sufficient pressure such as fluid pressure and/or the foamed material 48 to provide the skins with the peripheral reinforcing bead 40.

Figure 5:
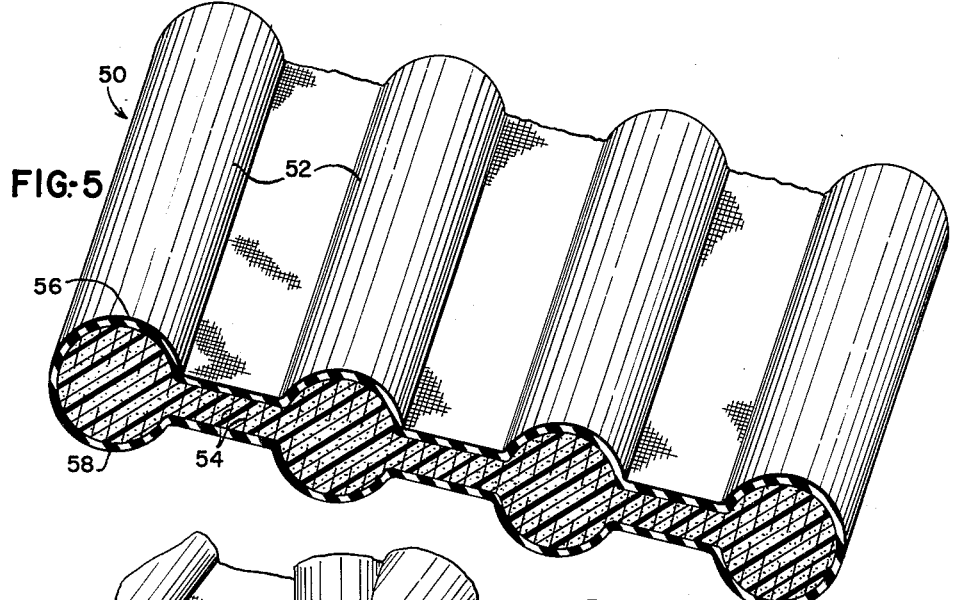
FIG. 5 is a diagrammatic view partly in section of a panel having parallel and longitudinally extending cylindrical contours formed by severing the drop threads and filled with a foamed material.

FIG. 5 shows an expandable panel 50 having a plurality of parallel cylindrical convex contours 52 on its surface. Drop threads 54 extending between the skins 56 and 58 are severed in the area defined by the convex contours. The inflation of the panel 50 with a pressure such as fluid pressure and/or the foamed material 60 expands the skins 56 and 58 into a cylindrical shape in the area in which the drop threads have been severed. The corrugated shape of the skins increases the bending and compressive strength of the panel.

Figure 6:
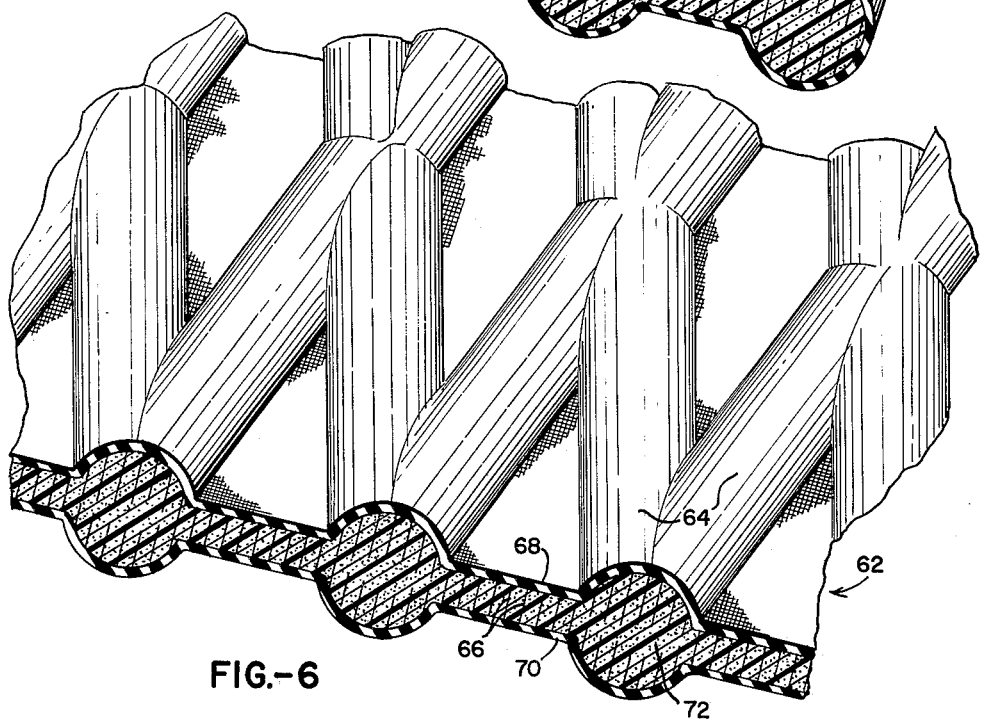
FIG. 6 is a diagrammatic view partly in section of a panel having intersecting contours formed by severing the drop cords and expanding the panel with a foamed material and fluid pressure.

FIG. 6 shows an inflatable panel 62 having intersecting convex contoured surfaces 64. The contours form a panel surface having diamond-shaped patterns. A plurality of drop thread 66 interconnect the skins 68 and 70 which form the surfaces. The drop threads are severed along the path of the contours. The pressures which expands the panel into a rigid structure expands the skin in the areas in which the drop threads have been severed to form the cylindrical contours. The space between the skins 68 and 70 contains foamed material 72 to increase the strength and rigidity of the panel.

Figure 7:
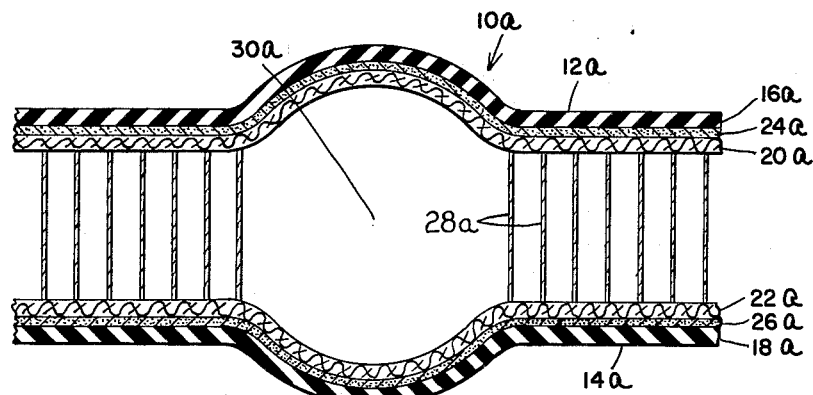
FIG. 7 is a broken away section of a panel where the drop threads were purposely eliminated during weaving along an elongated path.

FIGURE 7 illustrates a modification of the invention where a panel 10a has outer spaced skins 12a and 14a. Each skin is a laminate containing a fabric layer 20a, 22a, and a layer 16a, 18a, of flexible and elastic fluid impermeable material, such as rubber. The layers may be bonded together with an adhesive 24a, 26a. In this modification, a plurality of drop yarns 28a interconnect the fabric layers 20a, 22a. However, the weaving of the drop yarns is purposely omitted over a short area 30a having a width of about the thickness of the panel 10a, but being of elongated length with respect to the panel 10a so as to provide a strengthening rib when the panel is inflated. In a panel of this type the extra weaving and severance of drop yarns associated with the modification of FIGURES 1 and 2 is not necessary.

Figure 8:
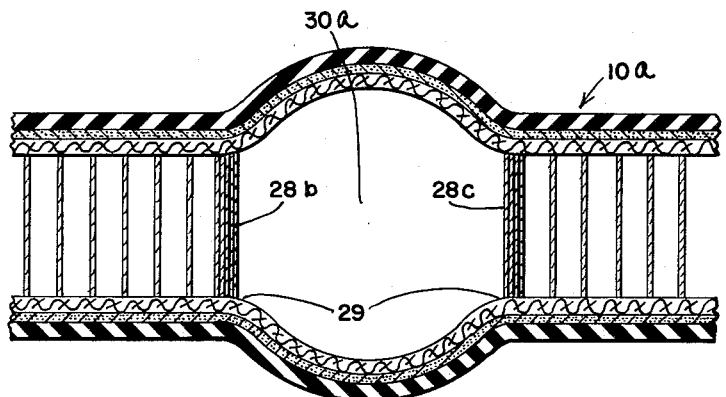
FIG. 8 is a broken away section of a panel where extra drop threads are added along the edges of the elongated path without drop threads to add strength to the edge section which receive extra pressure upon inflation.

FIGURE 8 illustrates an adaptation of the modification of FIGURE 7 where a plurality of extra reinforcing drop yarns 28b, 28c are provided along the edges 29 of the short open area 30a to effect a strengthening of the panel 10a is at the edges 29 upon inflation of the panel 10a to form the raised rib at the area 30a. It is contemplated that the drop yarn density of drop yarns 28b, 28c at the edges 29 will be at least three times the drop yarn density of the remainder of the panel 10a. It should also be understood that the increased density of the drop yarns of the edges of the elongated rib may be utilized in the embodiments of the invention shown in FIGURES 1 through 6.

While there have been shown, described, and pointed out the fundamental novel features of the invention as applied to the preferred embodiment, it will be understood that various omissions, substitutions, changes in form, and details of the apparatus illustrated may be made by those skilled in the art, without departing from the spirit of the invention. It is intended to be limited only as indicated by the scope of the following claims.

What is claimed is:

1. A method of increasing the stiffness of a fluid impervious substantially flat inflated panel having flexible and elastic outer skins interconnected with a plurality of unsevered drop threads comprising the steps of
    severing the drop thread in at least one elongated path, while said drop threads are accessible prior to making said panel fluid impervious, subsequently making the panel fluid impervious, and
    substantially inflating the panel with sufficient fluid pressure after it has been made fluid impervious to provide the substantially flat outer surface of the skins with cylindrical convex contours in the elongated path defined by the severed drop threads.

2. A method for increasing the stiffness of a fluid impervious inflated panel according to claim 1 which includes strengthening the adjacent edges of the elongated path by increasing the number of drop yarns along the adjacent edges while the drop yarns are still accessible before the panel is made fluid impervious.

3. A method for increasing the stiffness of a fluid impervious inflated panel according to claim 1 which includes providing a drop yarn density of between about 5 to about 75 drop yarns per square inch, and where the severing of the drop threads in an elongated path is across a width about equal to the thickness of the panel.

4. A method of reinforcing a panel having substantially flat flexible outer skins interconnected with a plurality of unsevered drop threads comprising the steps of
    severing the drop threads in at least one elongated path while the drop threads are accessible prior to complete assembly of the panel, so that said path extends substantially the entire distance of one length of the panel, and so that the width of the path is substantially equal to the thickness of the panel,
    depositing an amount of foamable material within the panel which when set up will fill the space between the panels and provide the substantially flat skins with cylindrical convex contours in the elongated path defined by the severed drop threads, subsequently making the panel fluid impervious and subsequently heating the panel containing the foamable material to cure and foam said material.

5. A method of reinforcing an inflatable panel having substantially flat flexible outer skins interconnected with a plurality of unsevered drop threads comprising the steps of
    severing the drop threads in at least one elongated path while the drop threads are accessible prior to making the panel capable of inflation,
    subsequently strengthening the adjacent edges of the elongated path by increasing the number of drop yarns therealong,
    subsequently depositing an amount of self-curing foamable material within the panel which when set up will fill the space between the panels and provide the substantially flat skins with cylindrical convex contours in the path defined by the severed drop threads,
    and subsequently making the panel fluid impervious before the foamable material has set up.

6. A method of reinforcing an inflatable panel having substantially flat flexible outer skins interconnected with a plurality of unsevered drop threads comprising the steps of
    severing the drop threads in at least one elongated path of a width substantially equal to the thickness of the panel while the drop threads are accessible prior to making the panel capable of inflation so that said elongated path extends substantially around the entire periphery of said panel,
    depositing an amount of heat curable foamable material within the panel which when set up will fill the space between the panels and provide the substantially flat skins with cylindrical convex contours in the area of the severed drop threads, drying the foamable material deposited in the panel, making the panel fluid impervious, and subsequently heating the panel containing the foamable material to cure and foam said material.

7. A method of providing a circular fluid inflatable panel having flexible substantially flat outer skins interconnected with a plurality of unsevered drop threads with a peripheral reinforcing bead comprising the steps of omitting the drop threads in a circular path defined by the periphery of the panel while positioning the other unsevered drop threads prior to making the panel capable of inflation, which path is substantially as wide as the thickness of the panel, subsequently reinforcing the adjacent edges of the elongated path, making the panel fluid imprevious and inflating the panel with sufficient fluid pressure to provide the substantially flat skins with a peripheral reinforcing bead formed from the expanded skins.

References Cited by the Examiner

UNITED STATES PATENTS

| | | | |
|---|---|---|---|
| 1,795,304 | 3/31 | Howard | 5—349 |
| 2,753,573 | 7/56 | Barker | 5—349 |
| 2,762,739 | 9/56 | Weis | 161—161 |
| 2,816,299 | 12/57 | Holladay | 5—349 X |
| 2,872,690 | 2/59 | Neisler | 156—292 X |
| 2,887,692 | 5/59 | Gosman | 5—349 X |
| 3,082,611 | 3/63 | Alvis et al. | 161—159 X |
| 3,138,506 | 6/64 | Ross | 161—98 X |

FOREIGN PATENTS 1,137,122  1/57  France.

EARL M. BERGERT, *Primary Examiner.*